United States Patent [19]
Tagg

[11] Patent Number: 5,687,434
[45] Date of Patent: Nov. 18, 1997

[54] PORTABLE STAND-ALONE SINK UNIT

[75] Inventor: Richard Leach Tagg, Sandhutton, England

[73] Assignee: PolyJohn Enterprises Corporation, Whiting, Ind.

[21] Appl. No.: 618,869

[22] Filed: Mar. 20, 1996

[51] Int. Cl.[6] .................................................. A47K 1/00
[52] U.S. Cl. .......................... 4/625; 4/626; 4/624; 4/628; 4/629; 4/655
[58] Field of Search ............................... 4/625, 626, 624, 4/628, 629, 653, 655, 516, 518

[56]        References Cited
        U.S. PATENT DOCUMENTS

| | | | |
|---|---|---|---|
| 4,765,003 | 8/1988 | Chang | 4/626 |
| 4,769,863 | 9/1988 | Tegg et al. | 4/625 |
| 5,031,258 | 7/1991 | Shaw | 4/624 |
| 5,502,848 | 4/1996 | Cowan | 4/628 |

*Primary Examiner*—David J. Walczak
*Attorney, Agent, or Firm*—Harness, Dickey & Pierce, P.L.C.

[57]        ABSTRACT

A portable wash station, comprising an outer water tank, a flexible inner water tank secured within the outer tank, and a sink basin affixed atop the outer tank including at least one sink, one water faucet for dispensing water from the outer tank and one drain for draining water from the sink into the inner tank. The flexible inner tank has an associated volume that expands as the water is dispensed from the outer tank and into the flexible inner tank, that contracts as the water is removed therefrom, and that is subjected to minimal hydraulic pressure from the water dispensed therein.

14 Claims, 4 Drawing Sheets

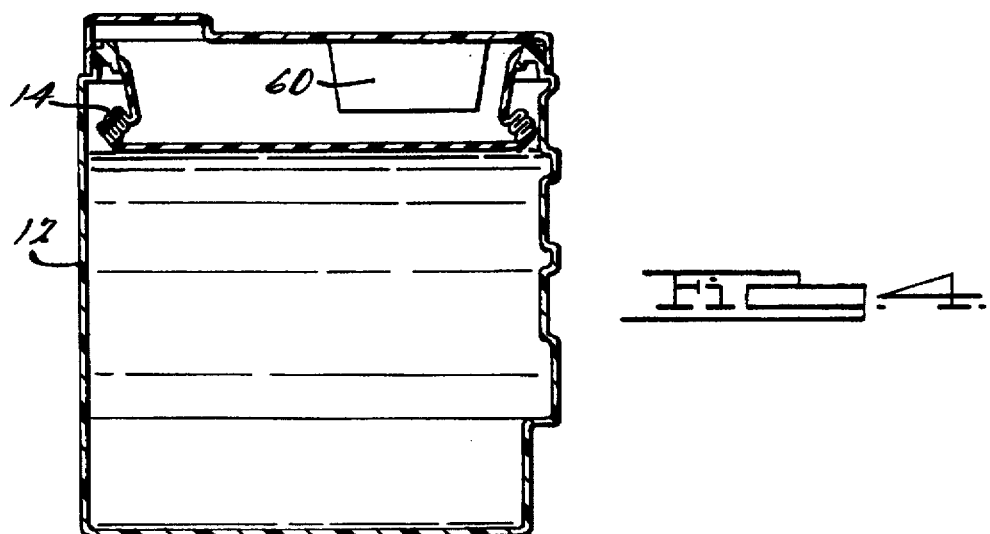
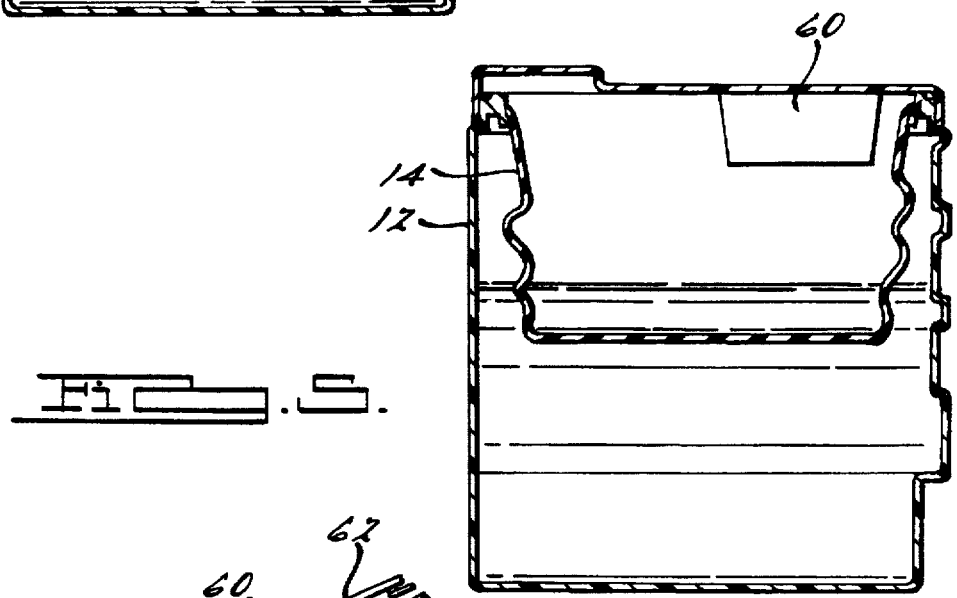
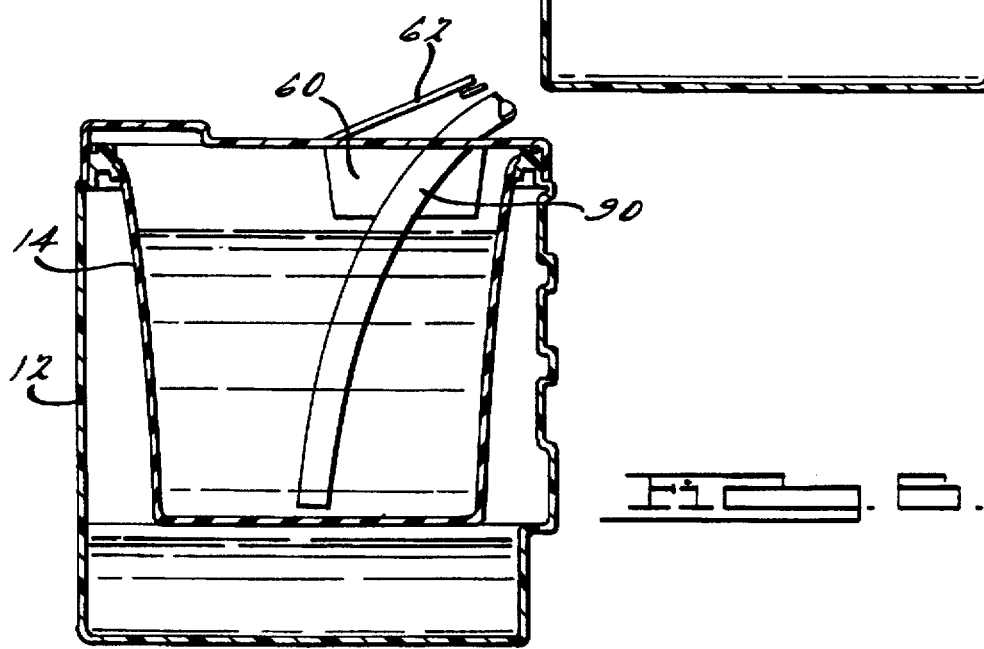

PORTABLE STAND-ALONE SINK UNIT

BACKGROUND OF INVENTION

This invention relates to a portable multi-station sink unit that includes a rigid outer water tank for storing fresh water and a flexible inner water tank mounted within the rigid outer tank for storing used water.

Conventional portable stand-alone sink units are typically placed at outdoor sights, such as outdoor concerts, constructions sights and public events for hygiene purposes. Such units typically have two or more water faucets and sinks, thereby permitting people to wash their hands at locations where such wash facilities are usually unavailable.

Typically, these sink units include self contained water tanks, as an external water supply is usually not readily available. Such water tanks must include the equivalent of two water tanks; one for storing clean, unused water, and one for storing water dispensed from the faucet and into the sink, otherwise known as "grey" water. Once a typical portable sink unit is placed in its desired location, water may be supplied to the first water tank through water delivery means such as a water tanker truck. Grey water may be removed from the second tank by means such as a vacuum tanker truck.

Several different types of designs exist in conventional portable sink units. One typical design includes a fiberglass outer housing defining both a rigid inner tank and a rigid outer tank and having two wash basins forming the lid of the structure. However, the fiberglass material makes such units relatively heavy. Also, due to the sometimes extreme loads placed on the structure and given the relatively fragile nature of fiberglass, such fiberglass structures are susceptible to damage. Further, typical tank designs offer limited access to the inner tank that houses the clean water, thus making cleaning of the inner tank difficult and sometimes impossible. Clean water dispensed into such an uncleaned tank often becomes contaminated. In addition, because both the inner and outer tanks are rigid, the maximum usable volume for each of the tanks is 50% of the total tank volume, as an equal amount of volume must be reserved for both the clean and the grey water.

In a second known configuration, a free standing sink unit includes a rotationally molded tank separated in half by a rigid partition, thereby keeping the clean water separate from the grey water. However, such a tank typically includes a water capacity for both the clean and the grey water of only approximately 35 U.S. gallons, as the rigid partition limits maximum clean water and grey water tank volume.

In a third type of stand-alone sink unit, a rotationally molded external tank is provided to store clean water. A bin liner bag is located within the external tank and fills with dispensed grey water as grey water is dispensed from the sink unit into the bag. However, such liner bags are susceptible to failure due to the hydraulic pressure placed on the bags as the bags are filled with grey water. Additionally, vacuum tanker suction hoses, when inserted into the bin liner bag to remove the grey water from the bag, have a tendency to either tear the liner bags or suck the liner bags into the tanker along with the grey water, thereby adding expense both to the unit and to the process of removing the grey water, as bags must be frequently replaced.

Alternatively, in the previously-described sink unit water tank designs, a diaphragm is sometimes placed across the rotationally molded tank from the front of the tank to the back of the tank, thereby partitioning the tank into a clean water side and a grey water side. Such a design allows a maximum amount of clean water to be dispensed into the tank, as the diaphragm is flexible and does not limit the clean water capacity to just one half of the tank, as do aforementioned prior rigid tank partitions. However, diaphragms, as with liner bags, are susceptible to failure caused by hydraulic pressure, as the diaphragm has a tendency to break loose from its retainers as water volume is increased. Also, vacuum tanker hoses also have a tendency to puncture the diaphragm, thereby causing mixing of the grey water with the fresh water.

Thus, it would be desirable to provide a portable stand-alone sink unit including both a clean water storage tank and a grey water storage tank, with the grey water storage tank being designed so as to exhibit a low failure rate and to effectively maintain separation of grey water from fresh water. It would also be desirable to provide a portable stand-alone sink unit that exhibits minimal interference with vacuum suction hoses used for removing grey water from the tank, thereby minimizing grey water disposal problems.

SUMMARY OF INVENTION

This invention contemplates a portable stand alone sink unit constructed of lightweight molded plastic and including a rigid outer water tank and a flexible inner water tank mounted within the rigid outer tank. The flexible inner tank expands and contracts in volume in response to the amount of grey water dispensed therein. Therefore, the water tanks of the present invention allow a maximum amount of fresh water to be held by the rigid outer tank. Further, the water tanks of the present invention provide an inner water tank that effectively stores grey water separately from fresh water and minimizes the chance of inner tank failure and thus mixing of grey water with fresh water. Minimal hydraulic pressure is exerted on the flexible inner tank, as the bottom of the flexible inner tank is immersed in the fresh water stored in the rigid outer tank. Further, the flexible inner tank is rigid enough so as to minimize interference with grey water removal upon removal of grey water from the inner tank through a tanker suction hose or other similar grey water disposal means.

In particular, the present invention provides a portable wash station, comprising an outer water tank, a flexible inner water tank secured within the outer tank, and a sink basin affixed atop the outer tank and including at least one sink, one water faucet for dispensing water from the outer tank, and one drain for draining water from the sink into the flexible inner tank. The flexible inner tank has an associated volume that expands as the water is dispensed from the outer tank and into the flexible inner tank, and that contracts as the water is removed therefrom. The flexible inner tank is immersed in the water held by the outer tank as it becomes filled to reduce hydraulic pressure thereon.

An object of this invention is to provide a portable stand alone sink unit having its own fresh water and grey water storage system.

A further object of this invention is to provide a portable stand alone sink unit composed primarily of a lightweight high or low density plastic, thereby making the sink unit lightweight, durable and easily transportable.

A further object of this invention is to provide a portable stand alone sink unit having a rigid outer tank and a flexible inner tank that effectively maintains separation of grey water from fresh water and that is less susceptible to failure when compared to conventional grey water holding tanks.

Still another object of this invention is to provide a portable stand alone sink unit that maximizes fresh water storage volume through use of a flexible inner grey water storage tank that expands and contracts in direct relation to the volume of grey water dispensed therein.

An additional object of this invention is to provide a portable free standing sink unit having a fresh water tank and a grey water tank, each of which is easily accessible for filling, draining, maintenance and cleaning purposes.

These and other objects and advantages of this invention will become apparent upon reading the following description, of which the attached drawings form a part.

DESCRIPTION OF DRAWINGS

FIG. 4 is a side cross-sectional view of the outer and inner tanks of the sink unit of the present invention, showing the outer tank being completely filled and the inner tank being completely empty;

FIG. 5 is a cross-sectional view of the tanks as shown in FIG. 3, with both the outer and inner tanks each partially being filled;

FIG. 6 is the cross-sectional view of FIG. 3, showing a near-empty outer tank and an inner tank being almost completely filled; and FIG. 7 is a perspective view of a portable stand-alone sink unit according to a third embodiment of the present invention.

DETAILED DESCRIPTION

Figure 1:
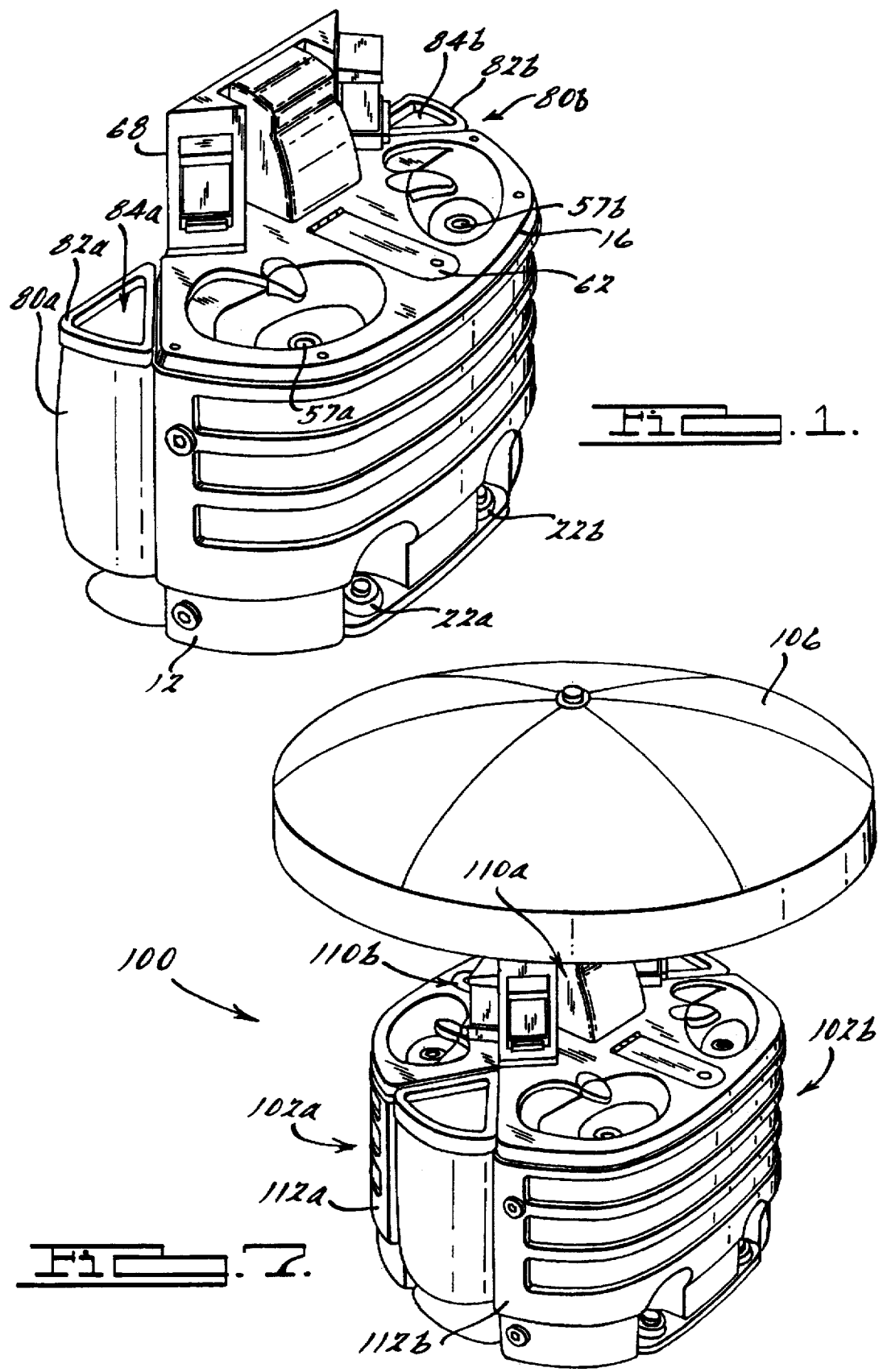
FIG. 1 is a perspective view of a portable stand-alone sink unit according to a preferred embodiment of the present invention.

Referring to the drawings, in which like numerals reference like parts, a portable stand-alone sink unit according to a preferred embodiment of the present invention is shown generally at 10. The sink unit of the present invention is a single integral unit that is movable and easily transportable from one location to another. The outer components of the sink unit are composed of high or low density rotationally molded plastic, thus making the sink unit extremely durable and capable of withstanding extreme environmental conditions and substantial amounts of abuse. As will be described in more detail below, the sink unit 10 includes a dual tank water storage system that maximizes the amount of fresh water that can be stored within the unit and minimizes the probably of contaminating the fresh water with grey water, and also facilitates ease of filling, drainage and cleaning of the dual tank system.

Figure 2:
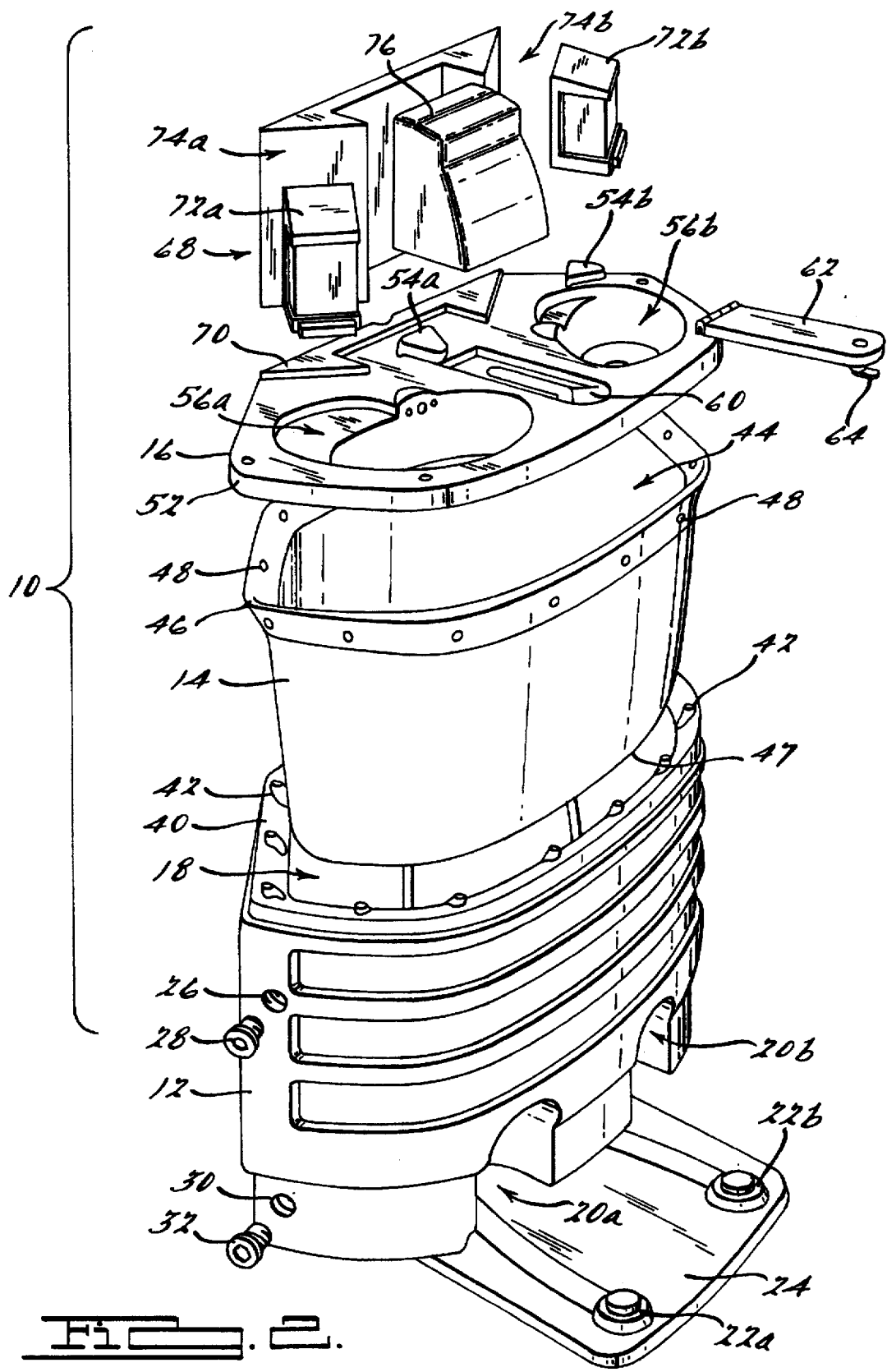
FIG. 2 is an exploded view of the sink unit shown in FIG. 1.

Referring to both FIGS. 1 and 2, the sink unit 10 includes a rigid outer tank 12, a flexible inner tank 14 located within the outer tank 12, and a sink basin 16 form fitted over both the outer and inner tanks 12, 14. The structure and function of each of these components will now be described in more detail.

Referring to FIG. 2, the rigid outer tank 12 is formed from linear low, or high, density thermoplastic material such as polyethylene and is rotationally molded into a shape which conforms to the shape of the sink basin 16. The body of the tank may be formed within indents, protrusions or other functional or ornamental shapes as desired. The outer tank 12 defines an interior liquid retaining cavity 18 having an associated volume, which is preferably about 70 U.S. gallons. Additionally, two recesses 20a, 20b are formed in the front of the tank to allow foot access to whale foot pumps 22a, 22b such as Whale foot pumps manufactured by Munster Simms Engineering Limited of Bangor, Northern Ireland, which are operatively mounted on a skid panel 24 formed from recycled plastic and secured to the underside of the tank 12 by rivets or any other like fasteners.

A fill port 26 is located near the upper portion of the outer tank 12 and is capped by a fill plug 28. Upon removal of the fill plug 28, a water hose may be inserted into the fill port to fill the inner cavity 18 of the tank with fresh water. Also, a drain port 30 is located near the bottom of the outer tank 12 and is capped by a threaded drain plug 32. Upon removal of the threaded drain plug 32, fresh water may be drained from the tank to reduce the overall weight of the sink unit for transportation purposes. Upon removal of the fill plug 28, the fill port may also be used to determine the volume of fresh water remaining in the outer tank 12.

The outer tank 12 additionally includes a shoulder 40 recessed from the outer periphery of the tank around the upper edge of the tank. The shoulder 40 includes several studs 42 that are used to secure the flexible inner tank 14 to the outer tank 12 in a manner described in detail below.

Still referring to FIG. 2, the flexible inner tank 14 is formed from material that may both expand and contract, while at the same time being durable enough to withstand substantial hydraulic pressure created as it is filled with water from the outer tank 12. Preferably, the inner tank 14 is formed from reinforced non-stretch plastic sheeting, which is a material typically used in the manufacture of pool liners. Such a material exhibits a high degree of durability, but yet is resilient enough so as not to be susceptible to being sucked up into a grey water removal hose (FIG. 6) when such a hose is inserted into the inner tank to remove grey water, unlike presently used diaphragms and soft plastic liners. The inner tank includes a liquid retaining inner cavity 44 that is capable of expanding and contracting in response to the volume of water dispensed therein. The inner tank also has an integral outer band 46 that defines the outer circumference of the flexible inner tank. The outer band is substantially thicker than the portion of the tank defining the cavity 44. The band 46 includes a plurality of snap buttons 48 that cooperate with the studs 42 on the outer tank shoulder 40 to maintain the inner tank 14 in fixed relation within the outer tank cavity 18. The inner tank bottom also includes a double-lined layer 47 to prevent the bag from being sucked up by a grey water disposal vacuum base during removal of the grey water.

While it is contemplated that the tab/aperture fastening system shown is preferably utilized to fasten the inner tank within the outer tank, it should be appreciated that other fastening devices may be utilized to maintain the flexible inner tank within the outer tank. Such fasteners may include screws, velcro, a cooperating tab/aperture arrangement or any other like retaining devices or configurations.

Still referring to FIG. 2, the sink basin 16 is placed over the opening 44 of the inner tank 14 and secured onto the shoulder 40 of the outer cavity 12 by rivets or other similar like fasteners (not shown). The sink basin includes faucets 54a, 54b and corresponding sinks 56a, 56b and drains 57a, 57b. A grey water disposal access port 60 is also located between the sinks 56a, 56b and provides limited access to the inner tank 14 to allow removal of the grey water by means such as a suction hose (FIG. 6) operatively connected to a suction tanker (not shown). A hinged disposal port lid 62 and corresponding lock 64 may be affixed over the disposal access port 60 to allow access to the inner tank only by personnel having an appropriate key.

Also, as shown in FIG. 2, a dispenser unit 68 is secured to a dispenser unit plate 70 by rivets or other like fasteners. Soap dispenser units 72a, 72b of the type well known in the art are affixed to the dispenser unit 68 on soap dispenser mountings 74a, 74b. Additionally, a paper towel dispenser 76 is also secured to the dispenser unit 68.

Additionally, as shown in FIG. 1, trash receptacles 80a, 80b may also be affixed to the outer tank 12 or alternatively to the sink basin 16 by any known fastening means. Alternatively, the trash receptacles 80a, 80b may be integrally formed along with either the outer tank or with the sink unit. The trash units each include a removable peripheral lid 82a, 82b each having associated apertures 84a, 84b insertable in a friction fit over each trash receptacle 80a, 80b to thereby engage the upper edges of a trash bag placed within the trash receptacle 80 in a friction fit between the lid 82 and the trash receptacle.

Figure 3:
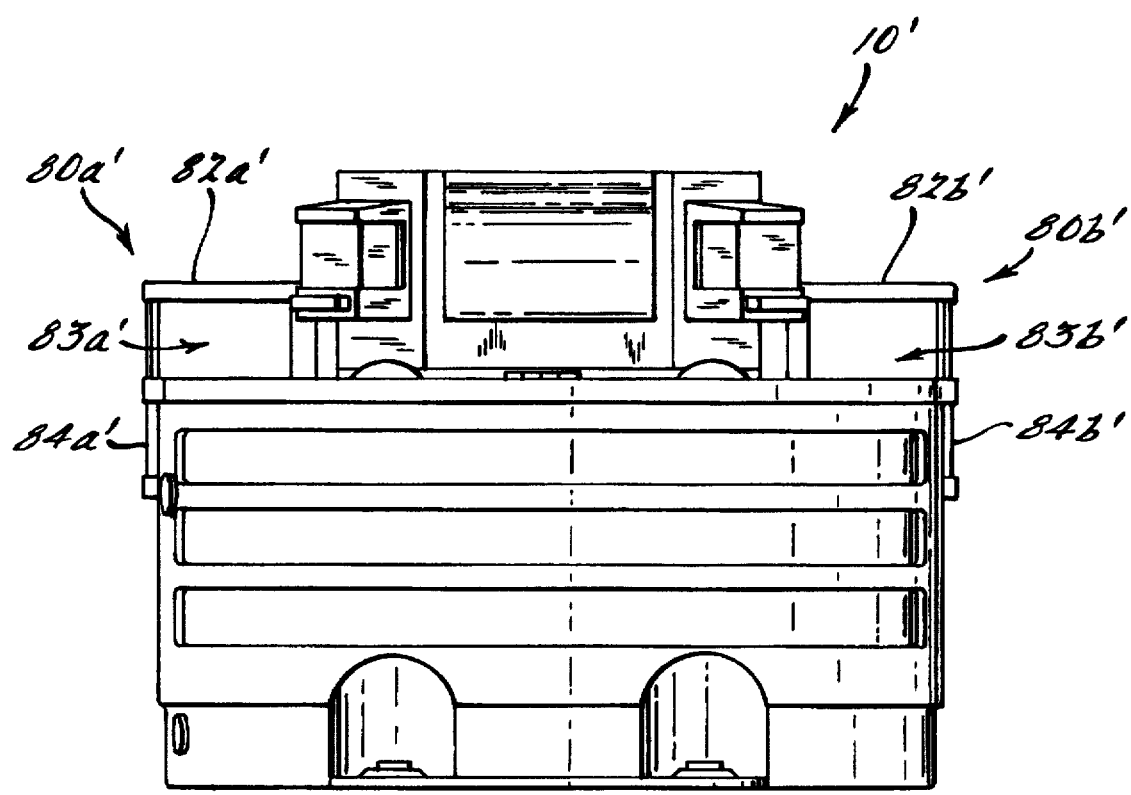
FIG. 3 is a front elevational view of a portable stand-alone sink unit according to a second embodiment of the present invention.

The trash receptacles may also be formed as shown at 80a', 80b' in a second embodiment 10' in FIG. 3. The trash receptacles 80a', 80b' include removable peripheral lids 82a', 82b' that include chutes 83a', 83b' that prevent rainwater and large pieces of trash from entering the receptacles. The receptacles 80a', 80b' include open ended lower portions 84a', 84b' that allow inserted trash bags (not shown) to bulge out therefrom as the bags are filled and to facilitate removal of the bags from the receptacles once the bags become filled.

Referring now to FIGS. 4-6, operation of the sink unit of the present invention, and specifically the water tank system of the present invention, will now be described.

As shown in FIGS. 4 and 5, the outer tank 12 is filled with fresh water to a level coinciding with the fill port 26. Upon the tank becoming filled, the fill plug 28 is inserted into the fill port 26 to effectively seal the outer tank 12 and contain the water within the cavity 18. As shown in FIG. 4, the water level causes the inner tank 14 to contract, thereby allowing maximum filling of the outer tank 12 with the fresh water. Such maximum filling of the outer tank 12 is not possible in conventional water tank systems employing a rigid partition dividing the outer tank effectively in half or by diaphragm type mechanisms.

As shown in FIGS. 1 and 5, a person desiring to dispense water from one of the faucets 54a, 54b pumps one of the pumps 22a, 22b with his or her foot, causing water to flow out of the outer tank 12 through one of the faucets and into one of the corresponding sinks 56a, 56b in a manner well known in the art. As the water is used and dispensed into the sink, the water flows through one of the sink drains 57a, 57b into the inner tank 14. As shown in FIG. 5, the grey water is contained within the inner tank separately from the fresh water in the outer tank 12. As the inner tank becomes immersed in the water contained in the outer tank, the remaining fresh water in the outer tank reduces hydraulic pressure on the flexible inner tank as the inner tank fills with grey water and its associated volume expands. Therefore, failure of the flexible inner tank due to hydraulic pressure is greatly reduced.

As shown in FIG. 6, the inner tank remains at least partially immersed in the fresh water even as the fresh water is almost depleted, and the inner tank becomes almost completely filled with grey water. At the end of a day of usage, after the sink unit has ceased being used, or upon depletion of the fresh water supply held by the outer tank 12, a grey water removal mechanism, such as the suction hose 90 operatively connected to a tanker truck (not shown), may be inserted through the inner tank disposal access port 60 subsequent to the access port lid 62 being unlocked and lifted. The grey water is then removed from the flexible inner tank through the hose. The flexible inner tank volume subsequently contracts, thereby allowing a new supply of fresh water to be dispensed into the outer tank 12 in a manner that maximizes the fresh water volume of the outer tank as described above.

Periodically, the sink basin 52 may be removed, and the flexible inner tank may be separated from the rigid inner tank for cleaning purposes. Such cleaning capability, which is not available in many conventional portable sink designs, permits high sanitary standards to be maintained and minimizes the chance of germs and bacteria being spread through contaminated water.

Referring to FIG. 7, a third alternate embodiment of the present invention is shown generally at 100. The embodiment shown generally at 100 comprises a four sink unit having dual two sink units 102a, 102b, each being a mirror image of the other and each having a structure identical to the sink unit shown generally at 10. In addition, an umbrella 106 is maintained within an aperture (not shown) defined by the dispenser units 110a, 110b for providing shade to persons using the sink units and to provide a display area for advertising.

Thus, at this point, it should be appreciated that the portable stand-alone sink unit of the present invention provides for a maximum sink unit usage period through maximum use of the water storage tank. The sink unit of the present invention utilizes a flexible grey water storage tank that is constructed of a material that is durable enough to withstand hydraulic pressures and minimize the chance of being torn or otherwise damaged upon insertion of a grey water removal mechanism, while at the same time is flexible enough to allow the inner tank volume to be expanded or contracted according to the level of fresh water in the outer tank and the level of grey water in the inner tank. Therefore, sink unit repair and down time is minimized, as the inner tank does not need to be replaced as often as less durable inner tank liners and diaphragms as used in conventional sink unit water tank systems. Overall long term sink unit maintenance costs are thus reduced.

This invention may be further developed within the scope of the following claims. Thus, the foregoing description is intended to be illustrative of an operative embodiment and not in a strictly limiting sense.

Having fully described an operative embodiment of this invention, I now claim:

1. A portable wash station, comprising:
   an outer water tank for holding a volume of fresh water;
   a flexible inner water tank secured within said outer tank; and
   a sink basin affixed atop said outer tank including at least one sink, one water faucet for dispensing water from said outer tank, and one drain for draining water from said sink into said inner tank;
   said flexible inner tank having an associated volume that expands as said water is dispensed from said outer tank and into said flexible inner tank, and that contracts as said water is removed therefrom, said flexible inner tank being immersed in said volume of fresh water held in said outer water tank to minimize hydraulic pressure thereon.

2. The portable wash station of claim 1, wherein said outer water tank includes a shoulder around its periphery defining studs thereon and said flexible inner tank includes a band around its outer periphery that includes snap buttons cooperating with said studs to secure said inner tank within said outer tank.

3. The portable wash station of claim 1, wherein said sink basin defines a disposal access port that provides access to said flexible inner tank for removal of said water therefrom.

4. The portable wash station of claim 3, wherein said disposal access port includes a disposal access port lid lockably engaged with said sink basin.

5. The portable wash station of claim 1, further comprising a whale foot pump operatively coupled to said outer water tank for controlling dispensing of said water through said faucet.

6. The portable wash station of claim 1, further comprising a molded trash receptacle form-fitted to a side of said outer water tank.

7. The portable wash station of claim 1, wherein said outer water tank defines a fill port at an upper portion of said outer water tank for filling said outer water tank, and a drain port located at a lower portion of said outer water tank for draining said outer water tank.

8. The portable wash station of claim 1, wherein said flexible inner tank is formed from non-stretch plastic sheeting.

9. The portable wash station of claim 8, wherein said flexible inner tank includes a reinforced bottom layer.

10. A water storage system for a wash station having at least one water faucet, one sink, and one drain, comprising:

a rigid outer tank defining a water retaining cavity for storing unused fresh water, said rigid outer tank having a plurality of flanges around its periphery; and a flexible inner tank for storing water dispensed from said rigid outer tank, said inner tank having an associated volume that contracts when said inner tank is emptied and that expands when said inner tank is filled;

said inner tank having a retaining band around its periphery having an associated thickness greater than that of said inner tank and that includes a plurality of retainers for cooperatively engaging with said outer tank flanges for maintaining said inner tank within said outer tank water retaining cavity.

11. The water storage system of claim 10, wherein said inner tank is immersed in said water in said outer tank as said inner tank is filled, thereby minimizing hydraulic pressure thereon.

12. The water storage system of claim 10, further comprising inner tank access means for facilitating removal of said used water from said inner tank.

13. A portable wash station, comprising:

a rigid outer water tank for directly holding a volume of fresh water dispensed therein whereby water in said rigid outer water tank is in direct contact with sidewalls of said rigid outer water tank;

a flexible inner water tank seated within said rigid outer tank and secured to said rigid outer water tank by an inner tank retainer whereby water in said outer rigid water tank is able to directly contact an outer surface of said flexible inner water tank;

a sink basin affixed over said inner and outer tanks including at least one sink, at least one water faucet for dispensing water from said outer water tank into said at least one sink and at least one drain for draining water from said sink and into said flexible inner tank;

said flexible inner tank having an associated volume that increases as said water is dispensed from said outer tank into said flexible inner tank, and that decreases as said water is removed from said flexible inner tank;

a disposal access port defined in said sink basin allowing access to said flexible inner tank for removal of said water from said flexible inner tank;

said disposal access port including a disposal access port lid lockably engaged with said sink basin; and a foot pump operatively coupled to said faucet and said outer tank for controlling dispensing of said water through said faucet.

14. The portable wash station of claim 13, wherein said outer water tank defines fill and drain ports allowing filling and draining of said outer water tank, respectively, each of said apertures being sealed by a removable port plug.

* * * * *